US008091411B2

(12) United States Patent
Fulks

(10) Patent No.: US 8,091,411 B2
(45) Date of Patent: Jan. 10, 2012

(54) APPARATUS AND METHOD FOR ESTIMATING BOUNCE BACK ANGLE OF A STOPPED ENGINE

(75) Inventor: Gary C. Fulks, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 63 days.

(21) Appl. No.: 12/788,412

(22) Filed: May 27, 2010

(65) Prior Publication Data

US 2011/0290010 A1 Dec. 1, 2011

(51) Int. Cl.
*G01M 15/06* (2006.01)

(52) U.S. Cl. .................................................... 73/114.26

(58) Field of Classification Search ............... 73/114.25, 73/114.26, 114.28, 114.27

See application file for complete search history.

(56) References Cited

U.S. PATENT DOCUMENTS 6,499,342 B1 12/2002 Gonzales, Jr.
6,681,173 B2 1/2004 Turner et al.
6,684,687 B1 2/2004 Frojdh
6,988,031 B2 1/2006 McDonald et al.
7,011,063 B2 3/2006 Condemine et al.
7,079,939 B2 7/2006 Kataoka et al.
7,142,973 B2 11/2006 Ando
7,156,083 B2 1/2007 Nakamura
7,171,925 B2 * 2/2007 Beil et al. .................... 123/41 E
7,360,406 B2 4/2008 McDaniel et al.
7,975,534 B2 * 7/2011 Mc Donald et al. ....... 73/114.26
2003/0106364 A1 * 6/2003 Kimata et al. ............... 73/118.1
2008/0010037 A1 * 1/2008 Hashizume ................... 702/151
2008/0215225 A1 * 9/2008 Nakamura .................... 701/102
2010/0241302 A1 * 9/2010 Shimizu .......................... 701/29

OTHER PUBLICATIONS

McDonald, Dennis; Engine Position Tracking at Shutdown, SAE International, SAE Technical Paper Series (2005), 2005-01-0048.
Martin Müller, U.S. Appl. No. 12/783,075, filed May 19, 2010, Apparatus and Method for Estimating Stopped Engine Crank Angle.

* cited by examiner

*Primary Examiner* — Eric S McCall
(74) *Attorney, Agent, or Firm* — Lawrence D. Hazleton

(57) ABSTRACT

An engine control system, controller, and method for estimating a bounce back angle of an internal combustion engine. Typical crank sensors do not indicate crank direction, a feature that would be useful to determine if an engine reversal occurs leading to the engine accumulating a bounce back angle. A crank sensor signal is analyzed as the engine coasts to a stop so an engine reversal can be detected. After an engine reversal is detected, the crank sensor signal is analyzed to determine the bounce back angle. Engine reversal is detected by determining that the crank shaft has decelerated by more than a threshold value, or that the crank shaft has decelerated and then subsequently accelerated.

16 Claims, 6 Drawing Sheets

APPARATUS AND METHOD FOR ESTIMATING BOUNCE BACK ANGLE OF A STOPPED ENGINE

TECHNICAL FIELD OF INVENTION

The invention generally relates to controlling an internal combustion engine, and more particularly relates to determining a bounce back angle as part of estimating a stopped engine crank angle of the engine.

BACKGROUND OF INVENTION

It is known to use a crankshaft sensor outputting crank pulses to determine a crank angle of an internal combustion engine crankshaft for providing engine control timing information as part of controlling an engine combustion cycle. Such timing information is, for example, useful to control the timing of dispensing fuel by a fuel injector, or control the timing of a spark ignition device. It is desirable to know the stopped engine crank angle after an engine is stopped to facilitate restarting the engine. If the stopped engine crank angle is known prior to restarting the engine, engine cranking time and engine emissions may be reduced because the engine does not need to be cranked to learn the crank angle prior to starting the engine. Accurate estimation of a stopped engine crank angle should include determining a bounce back angle as part of the estimate. In general, bounce-back angle is determined by counting crank sensor pulses following a determination that an engine reversal has occurred. Crank angle and crank speed of a running engine are determined using various types of crankshaft sensors including variable reluctance (VR) type sensors, Hall effect type sensors, and inductive type sensors. However, while such sensors are an economical choice for determining crank angle and crank speed, they do not indicate the direction of crankshaft rotation, as is desired if engine bounce back occurs as the engine is being stopped. Engine bounce back occurs when the contents of an engine combustion chamber is compressed just as the crank stops rotating in the forward direction. The compressed contents may cause the crank to then rotate in a reverse direction that is opposite the rotation direction just prior to the crank initially stopping.

U.S. Pat. No. 7,360,406 to McDaniel et al. suggests a method for detecting engine reversal based on a calculated ratio that includes three time intervals between crank signal pulses being greater than a threshold. However, McDaniel's comparison to a single threshold is not able to detect engine reversal for all possible engine stopping conditions. In particular, McDaniel will not detect a direction reversal that results in a single crank signal pulse due to reverse crank rotation, and may double that error by incorrectly interpret that pulse as being due to forward crank rotation. U.S. Pat. No. 7,142,973 to Ando suggests a method that controls the timing that stopping of engine is initiated so that the engine coasts to a stop in more predictable manner. However, Ando uses a predetermined coast-down model that relies on the engine being properly warmed up and operating at nominal operating conditions to coast-down to a stop in a predictable manner. If the engine is not warmed up, or not operating at nominal conditions, Ando does not attempt to determine a stopped engine crank angle and is silent with regard to estimating a bounce back angle. U.S. Pat. No. 7,011,063 to Condemine et al. suggests another method that delivers fuel to at least one cylinder while the engine is coasting to a stop to more accurately control the coast-down process. However, such a method may increase fuel consumption and increase engine emissions due to incomplete fuel combustion. Like Ando, Condemine also relies on a predetermined coast-down model to predict the engine stopped crank angle and does not consider the effect of engine bounce back. U.S. Pat. No. 6,499,342 to Gonzales monitors the amplitude and period of a variable reluctance sensor signal to estimate the stopped engine crank angle. However, analyzing such a signal in the manner described adds cost and complexity to the signal processing electronics. Also, like Ando and Condemine, Gonzales does not address the effect of engine bounce back.

SUMMARY OF THE INVENTION

In accordance with one embodiment of this invention, an engine control system for determining a bounce back angle of an internal combustion engine is provided. The system includes a crank sensor and a controller. The crank sensor is configured to output a crank signal indicative of a crank angle and a crank speed. The controller is configured to determine the crank speed, determine that the engine is coasting, and determine the bounce back angle based on the crank signal following an engine reversal. The controller indicates the engine reversal when a crank speed decrease is greater than a crank speed decrease threshold.

In another embodiment of the present invention, an engine controller for determining a bounce back angle of an internal combustion engine is provided. The controller is configured to receive a crank signal indicative of a crank angle and a crank speed. The controller is configured to receive a crank signal indicative of a crank angle and a crank speed, determine the crank speed, determine that the engine is coasting, and determine the bounce back angle based on the crank signal following an engine reversal. The controller indicates the engine reversal when a crank speed decrease is greater than a crank speed decrease threshold.

In yet another embodiment of the present invention, a method for determining a bounce back angle of an internal combustion engine is provided. The method includes the step of providing a crank sensor configured to output a crank signal indicative of a crank angle and a crank speed. The method includes the step of determining the crank speed and determining that the engine is coasting. The method includes the step of indicating that an engine reversal has occurred when a crank speed decrease is greater than a crank speed decrease threshold. The method includes the step of determining the bounce back angle based on the crank signal following the indication of engine reversal.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
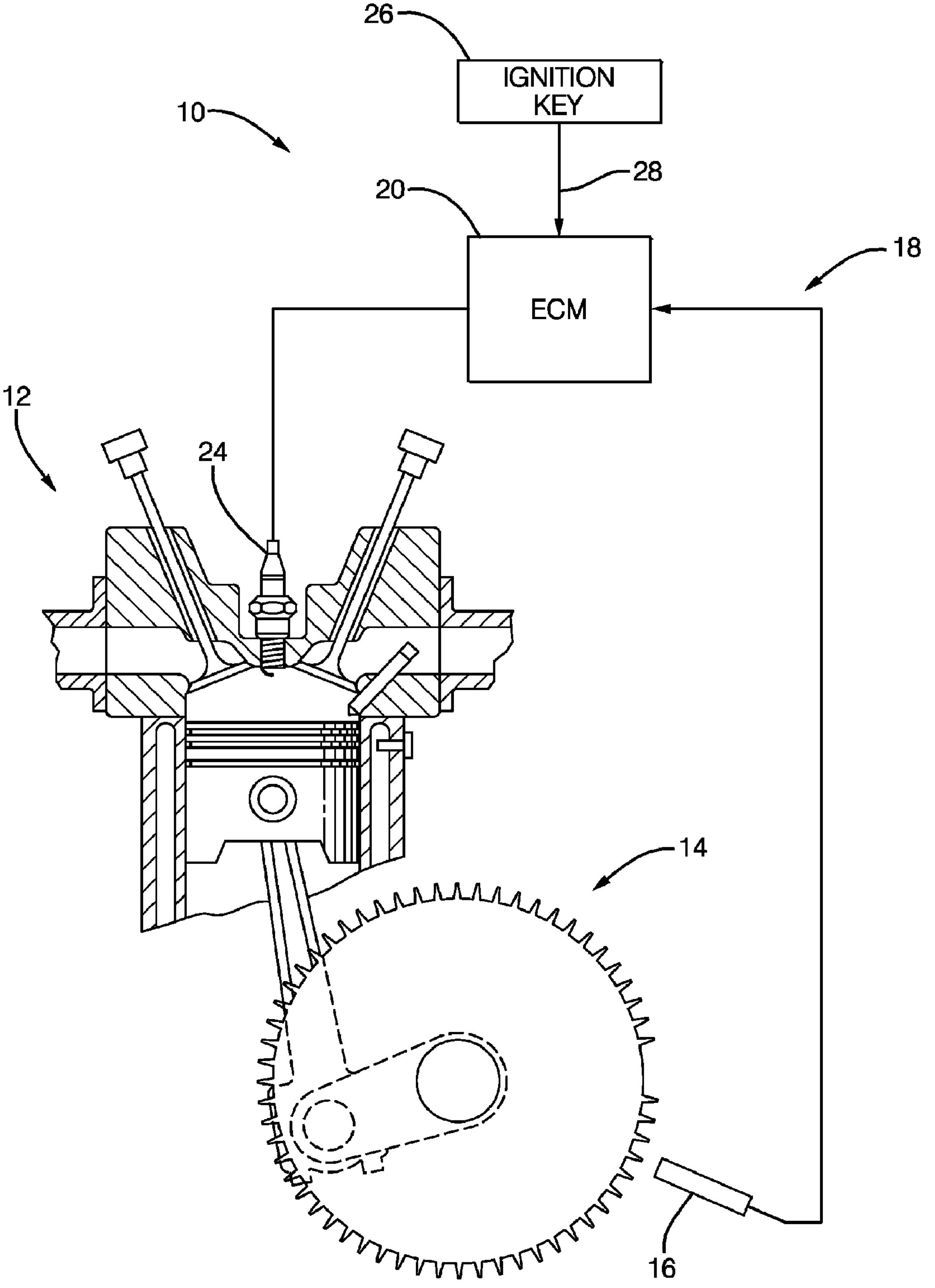
FIG. 1 is a cut-away view of an internal combustion engine having an engine control system in accordance with one embodiment.

FIG. 1 illustrates an embodiment of an engine control system 10 for estimating a stopped engine crank angle of an internal combustion engine 12 that includes determining a bounce back angle. The engine 12 is illustrated as having a single cylinder; however it will be appreciated that the system 10 may be readily adapted to engines having multiple cylinders. The system 10 may include a sixty minus two (60–2) tooth crank wheel 14 having fifty-eight (58) teeth arranged at six (6) degree angle intervals about the circumference of the crank wheel 14, and an eighteen (18) degree gap between the centers of the first tooth and the fifty-eighth tooth. Crank wheels having other numbers of teeth and different arrangements of variably spaced gaps between teeth may be adapted to estimate the stopped engine crank angle. A crank sensor 16 is positioned proximate to the crank wheel 14 such that the crank sensor 16 is able to sense rotational movement of the crank wheel teeth. Typically, the crank wheel 14 and the teeth are made from a ferrous material, such as steel. As such, as the teeth move through a magnetic field generated by the crank sensor 16, the teeth influence the magnetic field in a way that may be detected, particularly when the crank speed is greater than a threshold speed. It is well known how the arrangement of fifty-eight evenly spaced crank wheel teeth combined with an eighteen degree gap corresponding to a missing fifty-ninth and sixtieth tooth provides for the crank sensor 16 to output a crank signal 18 indicative of a crank angle and a crank speed.

Figure 2:
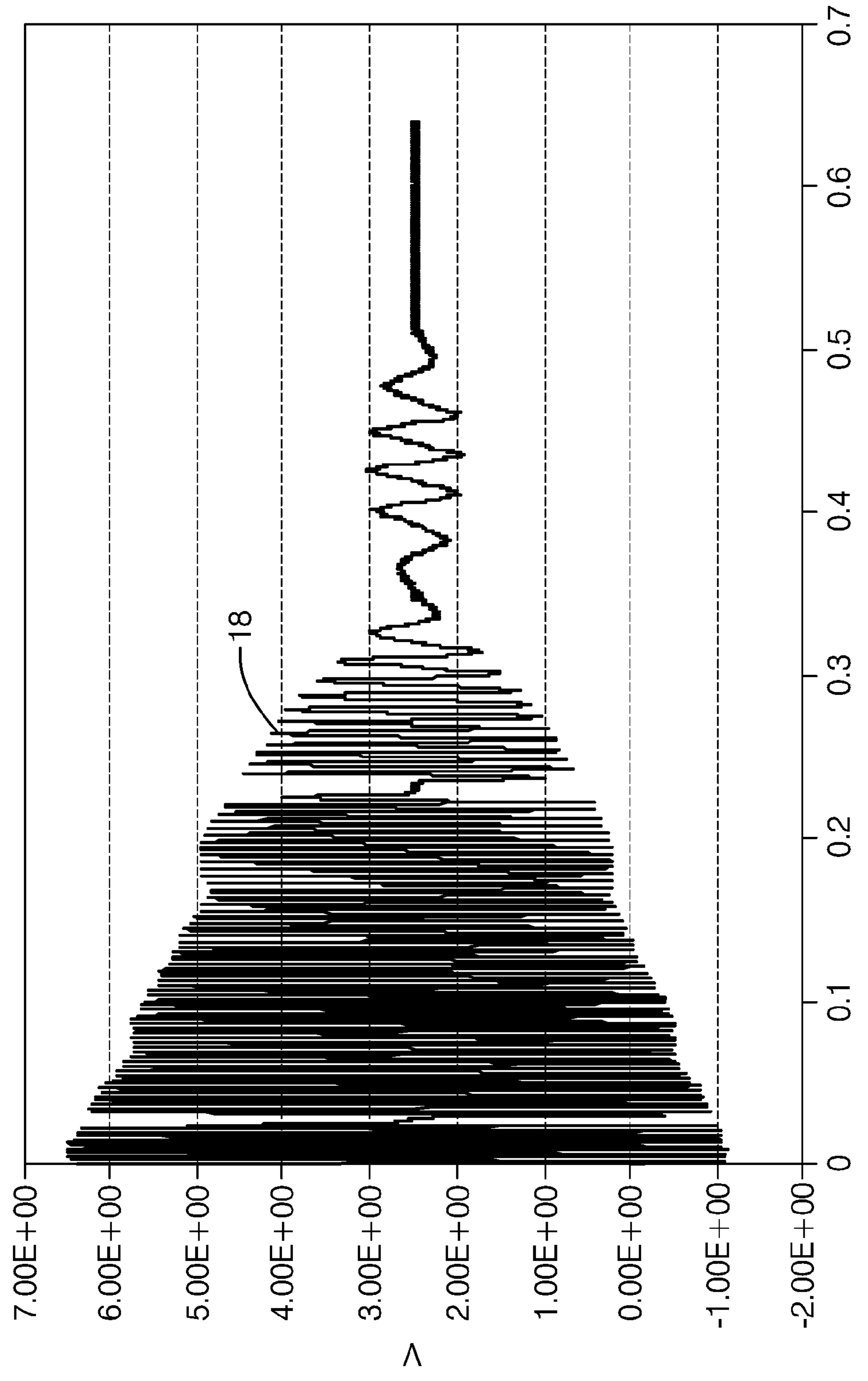
FIG. 2 is a graph of a signal occurring in the system of FIG. 1 in accordance with one embodiment.

In one embodiment, the crank sensor 16 may be a variable reluctance (VR) sensor. FIG. 2 illustrates a crank signal 18 output by an exemplary VR sensor having a generally sinusoidal shaped waveform. The discontinuities in the crank signal 18 at about 0.03 seconds and 0.23 corresponds to the missing teeth described above. The decreasing frequency and amplitude of the crank signal 18 is a typical characteristic of a signal output by VR sensor when an engine is being stopped. Alternately, the crank sensor 16 may be based on a Hall effect type sensor. It is known to provide a second crank sensor to provide a second crank signal that can be combined with the first crank signal 18 to eliminate the discontinuities shown.

Figure 3:
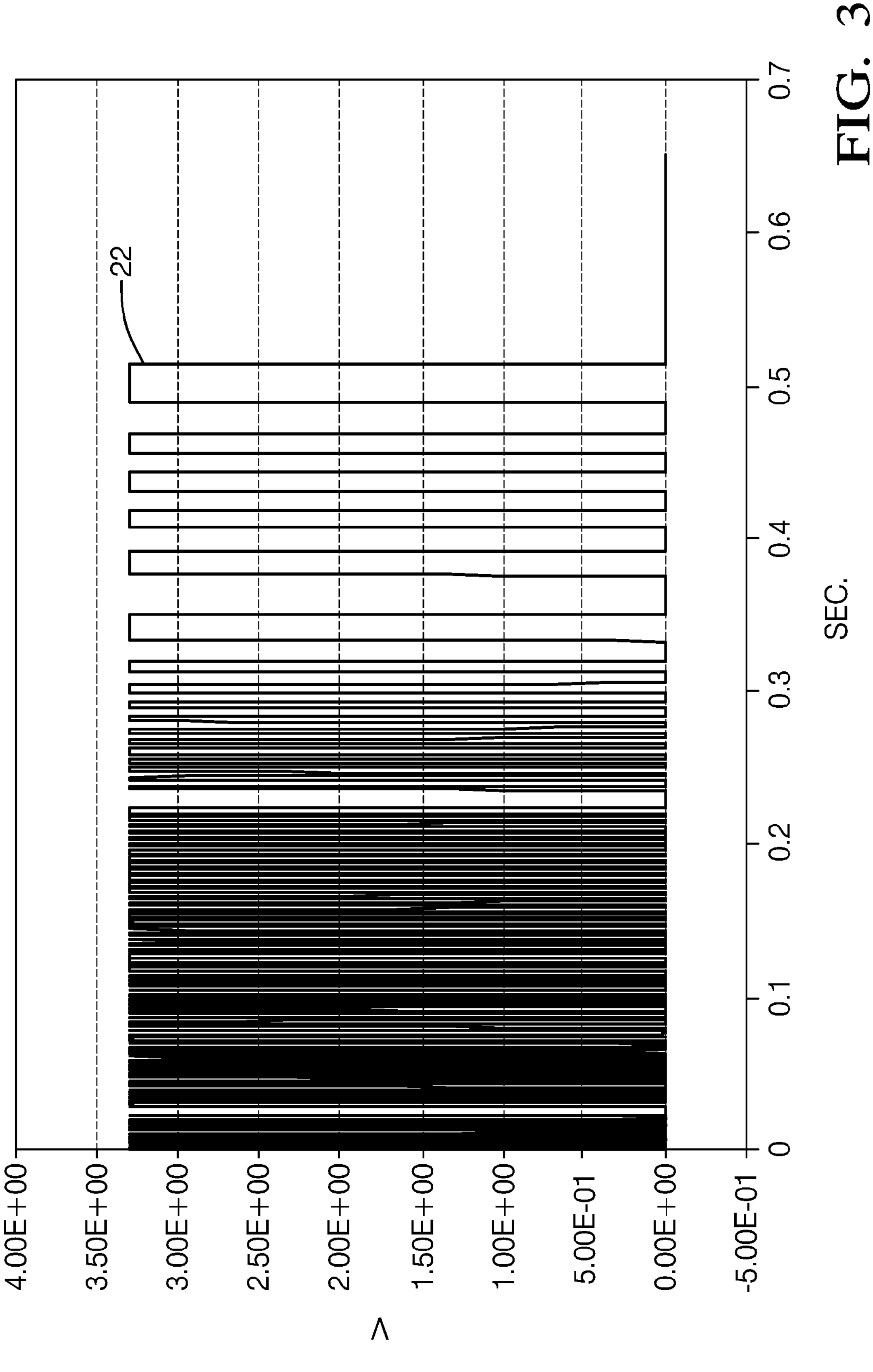
FIG. 3 is a graph of a signal occurring in the system of FIG. 1 in accordance with one embodiment.

Referring again to FIG. 1, the engine control system 10 may also include a controller 20, such as an engine control module (ECM), configured to determine a crank angle and a crank speed based on the crank signal 18. The controller 20 may include a microprocessor or other control circuitry as should be evident to those in the art. The controller may include memory, including non-volatile memory, such as electrically erasable programmable read-only memory (EEPROM) for storing one or more routines, thresholds and captured data. The one or more routines may be executed by the microprocessor to perform steps for determining a bounce back angle as described herein. It may be advantageous for the controller 20 to include a known zero-crossing detector for processing the crank signal 18 to generate a processed crank signal 22. FIG. 3 illustrates an example of a processed crank signal 22 in the form of a square wave having well defined rising edges and falling edges, and constant amplitude. The controller 20 may include other signal processing means known to those skilled in the art for filtering noise from the crank signal 18. Alternately, the zero-crossing detector or other signal processing means may be integrated into the crank sensor 16. Either way, the system 10 may include the means to process the crank signal 18 such that crank signal 18 or processed crank signal 22 comprises a plurality of crank pulses having a waveform that is readily characterized with regard to the time interval between each of the plurality of crank pulses, such as a constant amplitude square wave. As used herein, detecting a crank sensor pulse generally means detecting either a rising edge and/or falling edge of a pulse, and determining a time interval between pulses generally means determining a time between either two consecutive rising edges or two consecutive falling edges.

The crank angle and crank speed may be used by the controller 20 to control the operation of a device 24. For example, the device 24 may be a spark plug or a fuel injector. The presence of the spark plug implies that the engine is a spark ignition type engine. However, it will be appreciated that the determination of crank rotation direction and subsequent engine bounce-back may also be used on a compression ignition type engine. The crank speed 18 may also be used to determine that the engine 12 is coasting. As used herein, coasting means that the engine speed is decreasing and the engine is expected to stop. This may also be referred to as a coast-down event. The determination that the engine is coasting may be based on an engine on/off signal 28 generated by a vehicle operator turning an ignition key 26 to an OFF position, or may based on a signal generated within the controller 20 as part of a hybrid electric vehicle control routine, or may be based on the crank speed decreasing due to improper clutch/accelerator operation on a vehicle equipped with a manual transmission, wherein the decreasing crank speed is such that stalling of the engine 12 is likely.

Figure 4A:
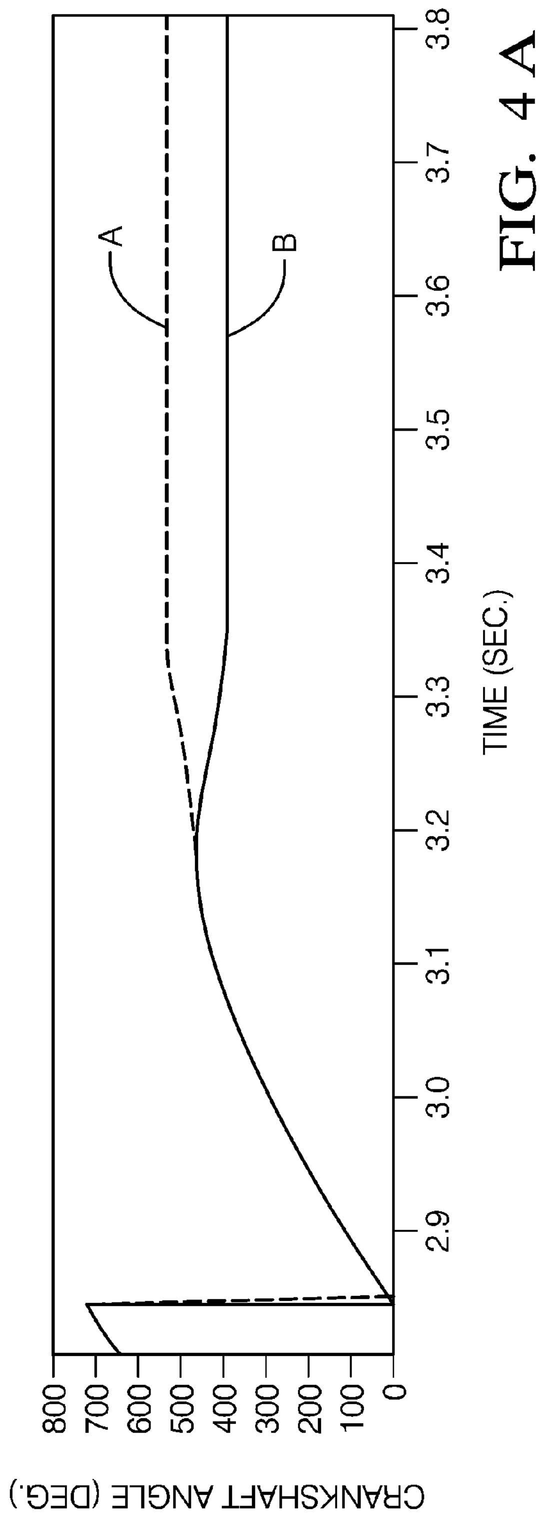
FIG. 4 is a graph of data corresponding to behavior of an internal combustion engine in FIG. 1 in accordance with one embodiment.
Figure 4B:
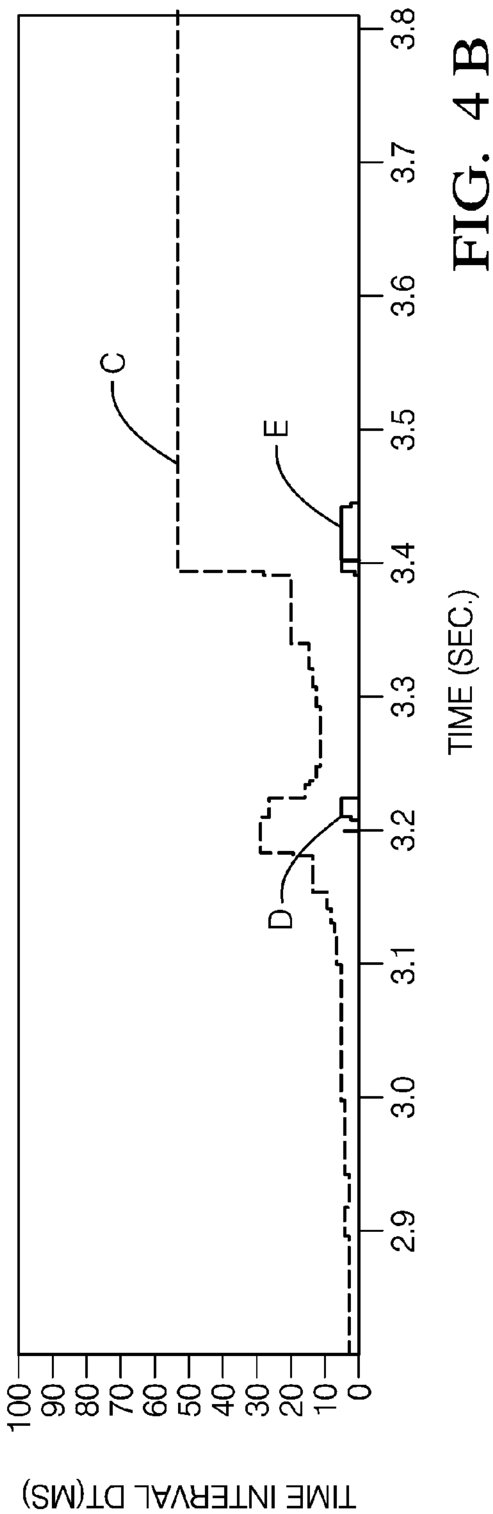

FIG. 4 shows processed data collected from the engine 12 during a coast-down event. FIG. 4A curve A illustrates a crank angle versus time if all of the crank pulses received by the controller 20 are assumed to be caused only by forward rotation of the crank wheel 14. FIG. 4A curve B illustrates a crank angle versus time for the same crank signal, but includes the effects of detecting an engine reversal at around 3.2 seconds so that the indicated crank shaft angle decreases after the 3.2 second mark due to the crank wheel rotating in the reverse direction. It has been observed that by including the engine reversal detection system and method described below in the engine control system 10, the coast down characteristic and bounce back angle such as that illustrated by curve B consistently matches data taken with laboratory grade equipment that is able to directly and accurately determine crank shaft angle and so can readily verify the accuracy of the bounce back angle determined by the engine control system 10. The way to detect engine reversal and bounce back angle is described in more detail below. FIG. 4B illustrates a graph of a time interval between adjacent crank pulses versus time that corresponds to the data in FIG. 4A. At around the 3.2 second mark, the value of the time interval had a local peak of about 28 milliseconds because the engine is stopping forward motion and reversing direction to rotate backward and generate a bounce back angle.

Referring again to FIG. 1, the engine control system 10 for determining a bounce back angle of an internal combustion engine has a crank sensor 16 configured to output a crank signal 18 indicative of a crank angle and a crank speed. In one embodiment, the crank signal 16 is formed by a series of pulses wherein the frequency of the pulses corresponds to the crank speed such that the crank speed is indicated by time intervals between various distinct pulses. The controller 20 may be configured to receive the crank signal 18 and determine the crank speed based on the crank signal 18. The controller may also be configured to determine that the engine is coasting, the meaning of which is defined above. The controller 20 may also be configured to determine the bounce back angle based on an analysis of the crank signal 18 following an engine reversal. As such, the controller 20 is preferably configured to determine that an engine reversal has occurred.

In one embodiment, the controller 20 is configured to perform a first test on indicated crank speed to determine that an engine reversal has occurred. The controller 20 may determine the crank speed based on time intervals between a pair of adjacent crank pulses. By analyzing a sequence of time intervals based on sequence of crank pulse times, an engine reversal may be determined. As such, engine reversal may be indicated if the crank speed decrease is greater than the crank speed increase threshold. It has been observed that a deceleration greater than the crank speed decrease threshold may occur when the crank speed decelerates to zero at about the same moment that a piston reaches top-dead-center (TDC).

If the crank stops just prior to TDC, the engine may reverse direction due to residual compression of air in one or more cylinders. Since the crank speed is determined based on time intervals, then an engine reversal may be indicated when a first time interval DT1 is greater than a second time interval DT2 by at least first threshold amount, wherein the second time interval DT2 occurs before the first time interval DT1. It is noted that such a test is able to detect reverse rotation of an engine that is followed by only one crank sensor pulse. This stands in contrast to a method for detecting engine reversals described by McDaniel (U.S. Pat. No. 7,360,406) that is unable to determine if an engine reversal has occurred unless the engine reversal is followed by at least two crank sensor pulses. Thus, McDaniel's comparison to a single threshold is not able to detect engine reversal for all possible engine stopping conditions. Furthermore, since McDaniel will not detect a direction reversal that results in a single crank signal pulse due to reverse crank rotation, McDaniel's method may double that error by incorrectly interpreting that pulse as being due to forward crank rotation.

In another embodiment, the controller 20 or the system 10 may be further configured to indicate the engine reversal when the second time interval DT2 is greater than the first time interval DT1, and the second time interval DT2 is greater than a third time interval DT3, and the second time interval DT2 is greater than a second threshold amount, wherein the third time interval DT3 occurs before the second time interval DT2. This combination of tests would indicate that the crank speed associated with a second time interval DT2 is slower that the crank speed associated with the time intervals either before or after the second time interval DT2. Also, the crank speed associated with a second time interval DT2 is slower that the crank speed associated with the second threshold amount. It has been observed that such a combination of tests detects engine reversals for estimating bounce-back angle that may be missed by other combinations of tests.

Figure 6:
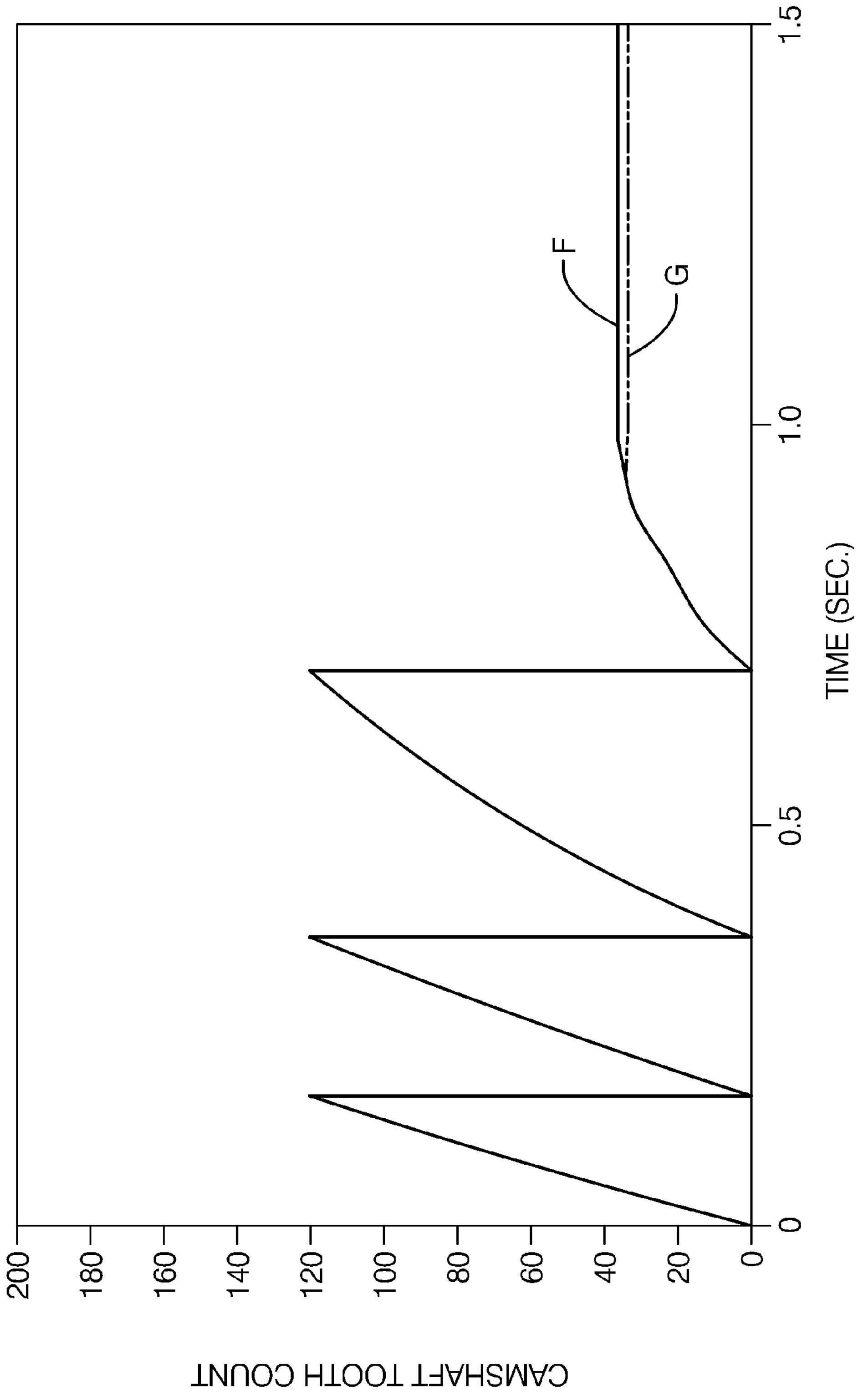
FIG. 6 is a graph of test data comparing an estimate of a stopped engine crank angle by the system of FIG. 1 in accordance with one embodiment to an estimate of a stopped engine crank angle in accordance with a prior art reference.

FIG. 6 shows test data of an estimation of stopped engine crank angle using the method as described by McDaniel in curve F, and an estimation of stopped engine crank angle as described herein in curve G. The engine is stopped after about 1 second. Curve F and curve G provide stopped engine crank angles that differ by two crank teeth; or about 12 degrees of difference and stopped engine crank angle when using the crank wheel 14 described above. Curve G was verified to be an accurate estimation of the stopped engine crank angle using other laboratory means.

In one embodiment the first time interval DT1 corresponds to a time interval between a first pulse time T1 and a second pulse time T2, the second time interval DT2 corresponds to a time interval between the second pulse time T2 and a third pulse time T3, and the third time interval DT3 corresponds to a time interval between the third pulse time T3 and a fourth pulse time T4, wherein the fourth pulse time T4 precedes the third pulse time T3, the third pulse time T3 precedes the second pulse time T2, and the second pulse time T2 precedes the first pulse time T1. In one embodiment the arrangement of pulses is such that the first pulse time T1 is adjacent the second pulse time T2, the second pulse time T2 is adjacent the third pulse time T3, and the third pulse time T3 is adjacent the fourth pulse time T4. As used herein, two pulses are adjacent if there are no other pulses between the two pulses. Each pulse may be characterized has having a pulse time corresponding to a time that some feature of the pulse. For example, a pulse time may correspond to the rising edge of the pulse being characterized.

Figures 5A, 5B:
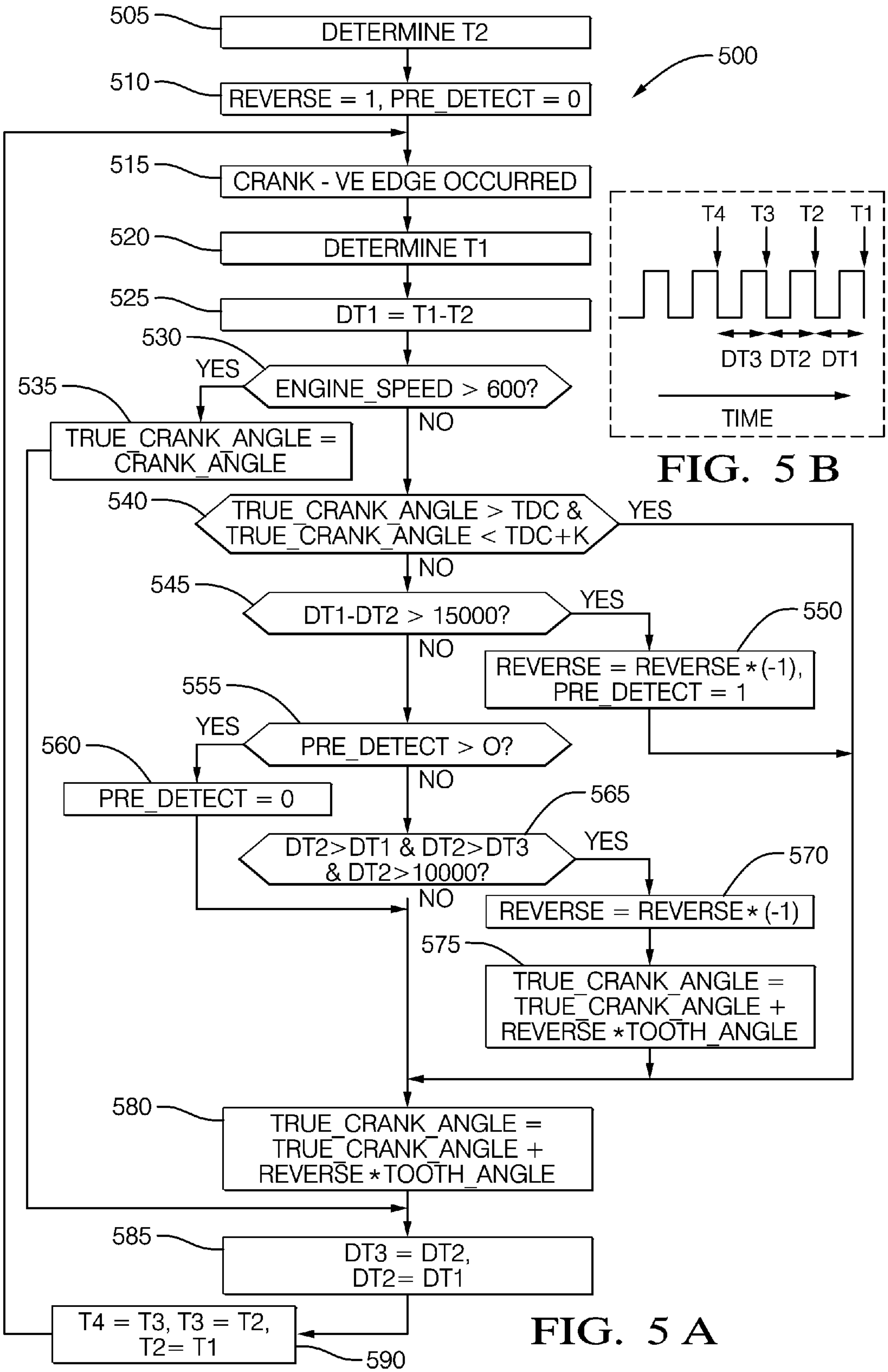
FIG. 5 is flowchart of a method to estimate a bounce back angle of an internal combustion engine in FIG. 1 in accordance with one embodiment.

FIG. 5A illustrates an embodiment of a routine or a method 500 for estimating a bounce back angle of an internal combustion engine 12 being stopped. The method 500 may include providing a crank sensor 16 configured to output a crank signal 18 indicative of a crank angle and a crank speed. At step 505, a second pulse time T2 is determined. It will be appreciated by the description below that prior to step 505 a third pulse time T3 will have been determined prior to determining the second pulse time T2, and that a forth pulse time T4 will have been determined prior to determining the third pulse time T3, as illustrated in FIG. 5B. In one embodiment, the pulse times T1, T2, T3, and T4 correspond to the time of falling edges of the sequence of pulses.

At step 510, a direction variable REVERSE is initialized to a value of 1. When REVERSE=1, the crankshaft 14 is indicated as rotating in the forward or normal engine operating direction, and so any crank pulses received will increase the crankshaft angle. Contrariwise, when REVERSE is changed to −1 as will be describe below, the crankshaft 14 is indicated as rotating in the backward or reverse engine direction, and so any crank pulses received will decrease the crankshaft angle. It is noted that multiple engine reversals have been observed during coast down testing, and so the sign of REVERSE may switch more than once during a single coast down event. Also, a reversal indicated flag PRE_DETECT is initialized to zero. When PRE_DETECT=0, an engine reversal by at least one reversal test is has not been indicated. The usefulness of PRE_DETECT will be described in more detail below.

At step 515, the routine 500 waits for a falling edge (-ve) of the crank signal 18. When a falling edge is detected, the routine 500 proceeds to step 520 where a new first pulse time T1 is determined. The new first pulse time T1 may update a buffer of pulse time generated as indicated in step 590. At step 525 an engine speed may be calculated based on a first time interval DT1 between the first pulse time T1 and the second pulse time T2. At step 530, a determination is made to see if the engine 12 is in the process of coasting to a stop. As one non-limiting example, the engine 12 may be coasting to a stop if an ENGINE_SPEED is less than 600 revolutions per minute (RPM). Alternately, the ENGINE_SPEED may be analyzed to determine that the ENGINE_SPEED is decreasing at a rate that is consistent with the engine 12 coasting to a stop. As suggested by step 530, if the ENGINE_SPEED is greater than 600 RPM, then it is presumed that the engine 12 is not in the process of being stopped, so the routine 500 executes step 535 to include the most recent pulse (T1) into a pulse accumulator CRANK_ANGLE to determine a TRUE_CRANK_ANGLE value, followed by step 590 that indexes the pulse times in preparation for receiving the next first pulse time T1. If the ENGINE_SPEED is less than 600 RPM, then it may be that the engine 12 is experiencing a coast-down event and may be coasting to a stop. As long as the engine speed remains above 600 RPM, no testing for engine reversal is performed.

At step 540, the TRUE_CRANK_ANGLE value is examined to see if the value indicates that the piston is past top-dead-center (TDC) by less than an angle threshold K. If YES, then an engine reversal is not expected and so the tests for detecting engine reversal starting with step 545 are bypassed. If the TRUE_CRANK_ANGLE value indicates that the crank shaft angle is before TDC, then it may be appropriate to test for an indication of engine reversal for determining a bounce back angle. It may be useful to know that an engine reversal has occurred while the engine 12 is coasting to a stop since the crank sensor 16 is unable to indicate the rotation direction of the crank wheel 14. With such a capability, the system 10 or controller 20 could continue to count pulses from the crank sensor 16 if engine bounce back occurs, and thereby better estimate the stopped engine crank angle. Without an indication that an engine reversal had occurred, the pulses from the crank sensor 16 occurring during bounce back would be interpreted as forward rotation of the crank wheel 14 and thereby degrade the accuracy of the stopped engine crank angle estimate.

At step 545, in accordance with one embodiment, a difference between the first time interval DT1 and the second time interval DT2 is compared to a threshold. If DT1 is greater than DT2, then there is an indication that the engine 12 may be decelerating. As the engine 12 coasts to a stop, the ENGINE_SPEED may periodically increase or decrease due to combustion chamber decompression. However it has been observed that the deceleration indicated by the difference in time intervals that occurs just prior to an engine reversal may be larger than decelerations experienced otherwise during coast down. As such if the difference indicates a deceleration greater that a crank speed decrease threshold, then that may be an indication that an engine reversal has occurred.

For example, as suggested by step 545, if DT1-DT2>15000, then there may be an indication that an engine reversal has occurred since a corresponding crank speed decrease is greater than a crank speed decrease threshold. As such, an engine reversal is indicated and so the routine 500 jumps to step 550 where the sign of the direction variable REVERSE is inverted so the most recent pulse and subsequent pulses are used to decrease the TRUE_CRANK_ANGLE so that reverse rotation of the crank 14 may be properly accounted for using the formula illustrated in step 580. The threshold value of 15000 shown here is a non-limiting exemplary value that may change depending on the type of engine, engine displacement, engine age, or other engine operating conditions. Exemplary values for DT1 and DT2 corresponds to 20 RPM and 50 RPM respectively, and so the threshold value of 15000 corresponds to a speed decrease of 30 RPM. Step 550 also sets the reversal indicated flag PRE_DETECT to 1 to indicate that an engine reversal has been detected by the first engine reversal test of step 545 and so prevent the second engine reversal test from being performed until at least two pulses are detected by step 515.

It has been observed that for some engine conditions, the first engine reversal test (step 545) described above may not always detect an engine reversal, and so a second engine reversal test may be used in conjunction with the first engine reversal test to more reliably detect an engine reversal. At step 555, if detection of an engine reversal by step 545 is not indicated, a second engine reversal test may be useful. At step 565, in accordance with one embodiment, a fourth pulse time T4 may be used to determined a third time interval DT3 based on a difference of the third pulse time T3 and the fourth pulse time T4. For example, the third time interval DT3 may be calculated using the equation DT3=T3-T4. The third time interval DT3 may then be used at step 565 for a second engine reversal test. In accordance with one non-limiting example, the second engine reversal test may include several comparison type tests whose results are logically AND'd to determine if an engine reversal has occurred. For example, the second engine reversal test may indicate that an engine reversal has occurred if DT2>DT1 and DT2>DT3 and DT2>10000. Passing such a test indicates that the second time interval is greater that both the first time interval DT1 and the third time interval DT3 and so the crank speed both before and after the second time interval DT2 is greater than the crank speed during the second time interval DT2. Also, to pass the test, the crank speed during the second test interval must be slower that some threshold, as indicate by the second time interval DT2 being greater than 10000, which corresponds to about 50 RPM.

If an engine reversal is indicated by the second engine reversal test of step 565, the routine 500 jumps to step 570 where the sign of the direction variable REVERSE is inverted. This is done so the most recent pulse and subsequent pulses are used to properly increase or decrease the TRUE_CRANK_ANGLE according to the direction of crankshaft rotation. At step 575 the TRUE_CRANK_ANGLE is incremented or decremented according to the sign of the direction variable REVERSE before proceeding to step 580, where the TRUE_CRANK_ANGLE is similarly incremented or decremented again. Step 575 is necessary following the detection of an engine reversal using the second test shown in 565 because the engine reversal occurred during the second time interval DT2, and so one pulse has been accumulated by TRUE_CRANK_ANGLE in the wrong direction.

Routine 500 is repeated until a predetermine period of time passes without a new first pulse time T1 being received by step 515, thereby indicating that the engine 12 is stopped. The crank angle when the engine comes to a stop is determined based on the value of the TRUE_CRANK_ANGLE when it is determined that the engine 12 has stopped. A bounce back angle may be determined based a separate tracking of engine reversals and counting crank pulses accumulated in a separate routine that will be apparent to those skilled in the art. It should be appreciated that during the stopping of an engine more than one engine reversal may occur, leading to rotation of the crank wheel 14 that will add to and subtract from the bounce back angle. For example, if the engine 12 is running such that the crank wheel 14 is rotating forward, and the ignition key 26 is turned to the OFF position, the engine 12 begins coasting to a stop. A first engine reversal may occur just as the engine 12 crank speed reaches zero, and so the crank wheel 14 begins to rotate backward and the crank signal 18 may be monitored to determine a bounce back angle. The reverse crank speed may then coast to zero, a second engine reversal may occur causing the engine to rotate in the forward direction and thereby decrease the bounce back angle.

Following step 580, at step 585 the various time intervals DT4, DT3, and DT2 are updated in preparation for receiving a new first time pulse T1 a step 515 and 520. Similarly, at step 590, the various pulse times T4, T3, and T2 are updated in preparation for receiving a new first time pulse T1 a step 515 and 520.

Accordingly, a system 10, a controller 20 and a method 500 for determining engine reversals during a coast down event and determining a bounce back angle of an internal combustion engine is provided. When an engine is coasting to a stop, a crank signal is analyzed to determine if an engine reversal has occurred. Following the detection of an engine reversal, a bounce back angle corresponding to how much reverse rotation of the coasting engine occurs is determined. By determining a bounce back angle, a more accurate estimate of the stopped engine crank angle is determined so the engine can be more readily restarted when compared to engine control system that must crank the engine to determine the engine crank angle before actually starting the engine.

While this invention has been described in terms of the preferred embodiments thereof, it is not intended to be so limited, but rather only to the extent set forth in the claims that follow.

We claim:

1. A system for determining a bounce back angle of an internal combustion engine, said system comprising:

a crank sensor configured to output a crank signal indicative of a crank angle and a crank speed; and a controller configured to determine the crank speed, determine that the engine is coasting, and determine the bounce back angle based on the crank signal following an engine reversal, wherein the controller is further configured to indicate the engine reversal when a crank speed decrease is greater than a crank speed decrease threshold.

2. The system in accordance with claim 1, wherein the crank signal comprises a plurality of pulses, the crank speed is indicated by a time interval between pulses, and the crank speed decrease is greater than the crank speed decrease threshold when a first time interval is greater than a second time interval by at least first threshold amount, wherein the second time interval occurs before the first time interval.

3. The system in accordance with claim 2, wherein said controller is further configured to indicate the engine reversal when the second time interval is greater than the first time interval, the second time interval is greater than a third time interval, and the second time interval is greater than a second threshold amount, wherein the third time interval occurs before the second time interval.

4. The system in accordance with claim 3, wherein the first time interval corresponds to a time interval between a first pulse time and a second pulse time, the second time interval corresponds to a time interval between the second pulse time and a third pulse time, and the third time interval corresponds to a time interval between the third pulse time and a fourth pulse time, wherein the fourth pulse time precedes the third pulse time, the third pulse time precedes the second pulse time, and the second pulse time precedes the first pulse time.

5. The system in accordance with claim 4, wherein the first pulse time is adjacent the second pulse time, the second pulse time is adjacent the third pulse time, and the third pulse time is adjacent the fourth pulse time.

6. A controller for determining a bounce back angle of an internal combustion engine, said controller configured to receive a crank signal indicative of a crank angle and a crank speed, determine the crank speed, determine that the engine is coasting, and determine the bounce back angle based on the crank signal following an engine reversal, wherein the controller is further configured to indicate the engine reversal when a crank speed decrease is greater than a crank speed decrease threshold.

7. The controller in accordance with claim 6, wherein the crank signal comprises a plurality of pulses, the crank speed is indicated by a time interval between pulses, and the crank speed decrease is greater than the crank speed decrease threshold when a first time interval is greater than a second time interval by at least first threshold amount, wherein the second time interval occurs before the first time interval.

8. The controller in accordance with claim 7, wherein said controller is further configured to determine an engine bounce back angle based on the crank signal when the second time interval is greater than the first time interval, the second time interval is greater than a third time interval, and the second time interval is greater than a second threshold amount, wherein the third time interval occurs before the second time interval.

9. The controller in accordance with claim 8, wherein the first time interval corresponds to a time interval between a first pulse time and a second pulse time, the second time interval corresponds to a time interval between the second pulse time and a third pulse time, and the third time interval corresponds to a time interval between the third pulse time and a fourth pulse time, wherein the fourth pulse time precedes the third pulse time, the third pulse time precedes the second pulse time, and the second pulse time precedes the first pulse time.

10. The controller in accordance with claim 9, wherein the first pulse time is adjacent the second pulse time, the second pulse time is adjacent the third pulse time, and the third pulse time is adjacent the fourth pulse time.

11. A method for determining a bounce back angle of an internal combustion engine, said method comprising:

providing a crank sensor configured to output a crank signal indicative of a crank angle and a crank speed;

determining the crank speed;

determining that the engine is coasting;

indicating that an engine reversal has occurred when a crank speed decrease is greater than a crank speed decrease threshold;

determining the bounce back angle based on the crank signal following the indication of engine reversal.

12. The method in accordance with claim 11, wherein the crank signal comprises a plurality of crank pulses, the step of determining the crank speed includes determining a time interval between pulses, and the step of indicating that an engine reversal has occurred when a crank speed decrease is greater than a crank speed decrease threshold includes determining that a first time interval is greater than a second time interval by at least first threshold amount, wherein the second time interval occurs after the first time interval.

13. The method in accordance with claim 12, said method further comprising the step of:

indicating that an engine reversal has occurred when the second time interval is greater than the first time interval, the second time interval is greater than a third time interval, and the second time interval is greater than a second threshold amount, wherein the third time interval occurs before the second time interval.

14. The method in accordance with claim 12, wherein the first time interval corresponds to a time interval between a first pulse time and a second pulse time, the second time interval corresponds to a time interval between the second pulse time and a third pulse time, and the third time interval corresponds to a time interval between the third pulse time and a fourth pulse time, wherein the fourth pulse time precedes the third pulse time, the third pulse time precedes the second pulse time, and the second pulse time precedes the first pulse time.

15. The method in accordance with claim 11, wherein the first pulse time is adjacent the second pulse time, the second pulse time is adjacent the third pulse time, and the third pulse time is adjacent the fourth pulse time.

16. The method in accordance with claim 11, wherein the step of indicating that an engine reversal has occurred includes determining the crank angle when the crank speed approaches zero, and indicating that an engine reversal has not occurred if the crank angle when the engine speed approaches zero corresponds to a crank angle that is past top-dead-center by a predetermined constant.

* * * * *